United States Patent
Sharma et al.

(10) Patent No.: US 7,428,347 B2
(45) Date of Patent: Sep. 23, 2008

(54) OPTICAL SIGNAL TRANSMISSION TRANSDUCER

(75) Inventors: Manish Sharma, Mountain View, CA (US); Manoj K. Bhattacharyya, Cupertino, CA (US)

(73) Assignee: Samsung Electronics Co., Ltd. (KR)

( * ) Notice: Subject to any disclaimer, the term of this patent is extended or adjusted under 35 U.S.C. 154(b) by 1050 days.

(21) Appl. No.: 10/414,927

(22) Filed: Apr. 16, 2003

(65) Prior Publication Data

US 2004/0208411 A1 Oct. 21, 2004

(51) Int. Cl.
*G02F 1/01* (2006.01)
(52) U.S. Cl. .............................. 385/1; 257/421; 324/252
(58) Field of Classification Search ................ 385/1
See application file for complete search history.

(56) References Cited

U.S. PATENT DOCUMENTS

| | | | | |
|---|---|---|---|---|
| 6,232,777 B1 * | 5/2001 | Sato et al. | .................. | 324/252 |
| 6,532,323 B2 | 3/2003 | Kim et al. | | |
| 6,549,454 B1 * | 4/2003 | Slaughter | .................. | 365/158 |
| 6,756,649 B2 * | 6/2004 | Moddel et al. | .............. | 257/425 |
| 7,173,275 B2 * | 2/2007 | Estes et al. | ..................... | 257/29 |
| 2003/0123335 A1 * | 7/2003 | Rettner et al. | ............ | 369/13.24 |

OTHER PUBLICATIONS

Yiping He, et al, Electronics Letters, Nov. 22, 2001, vol. 37, No. 24, pp. 1459-1460.*

* cited by examiner

*Primary Examiner*—David A. Vanore
*Assistant Examiner*—Philip A. Johnston
(74) *Attorney, Agent, or Firm*—Myers Bigel Sibley & Sajovec

(57) ABSTRACT

The invention includes an optical signal transmission transducer. The optical signal transmission transducer includes a magnetic tunnel junction. The magnetic tunnel junction can be tuned to switch states in response to selected frequencies of a magnetic field. A light source can be modulated based upon states of the magnetic tunnel junction. An alternate embodiment of the optical signal transmission transducer includes a light transducer that generates magnetic sense signals based upon reception of modulated light signals. The light transducer can be integrated with a magnetic tunnel junction. The magnetic tunnel junction can be tuned to switch states in response to selected frequencies of the magnetic sense signal.

28 Claims, 13 Drawing Sheets

```
┌─────────────────────────────────────────────────────────────────────────┐
│ FILTERING A PLURALITY OF INFORMATION CARRYING SIGNALS WITH A MAGNETIC TUNNEL │
│   JUNCTION, THE MAGNETIC TUNNEL JUNCTION BEING TUNED TO SWITCH STATES IN    │
│              RESPONSE TO SELECTED FREQUENCIES OF THE MAGNETIC FIELD          │
│                                    1105                                     │
└─────────────────────────────────────────────────────────────────────────┘
                                      │
                                      ▼
┌─────────────────────────────────────────────────────────────────────────┐
│              SENSING THE STATES OF THE MAGNETIC TUNNEL JUNCTION             │
│                                    1110                                     │
└─────────────────────────────────────────────────────────────────────────┘
                                      │
                                      ▼
┌─────────────────────────────────────────────────────────────────────────┐
│        DRIVING A LIGHT SOURCE WITH THE SENSED STATES OF THE MAGNETIC TUNNEL JUNCTION │
│                                    1115                                     │
└─────────────────────────────────────────────────────────────────────────┘
```

FIGURE 11A

```
┌─────────────────────────────────────────────────────────────────────────┐
│              SENSING A PLURALITY OF INFORMATION CARRYING OPTICAL SIGNALS    │
│                                    1120                                     │
└─────────────────────────────────────────────────────────────────────────┘
                                      │
                                      ▼
┌─────────────────────────────────────────────────────────────────────────┐
│  FILTERING THE PLURALITY OF INFORMATION CARRYING OPTICAL SIGNALS WITH A MAGNETIC │
│   TUNNEL JUNCTION, THE MAGNETIC TUNNEL JUNCTION BEING TUNED TO SWITCH STATES IN │
│              RESPONSE TO SELECTED FREQUENCIES OF THE MAGNETIC FIELD          │
│                                    1125                                     │
└─────────────────────────────────────────────────────────────────────────┘
                                      │
                                      ▼
┌─────────────────────────────────────────────────────────────────────────┐
│              SENSING THE STATES OF THE MAGNETIC TUNNEL JUNCTION             │
│                                    1130                                     │
└─────────────────────────────────────────────────────────────────────────┘
```

FIGURE 11B

OPTICAL SIGNAL TRANSMISSION TRANSDUCER

FIELD OF THE INVENTION

The invention relates generally to transmission of signals. More particularly, the invention relates to an optical signal transmission transducer.

BACKGROUND OF THE INVENTION

Optical communication systems can include information signals that are transmitted through an optical transmission medium. FIG. 1 shows an optical medium 110 (typically an optical fiber) that can serve as a transmission medium for optical signals. Generally, a transducer 120 converts electrical signals generated by a signal source 130 into optical signals. The electrical signals of the signal source 130 can be modulated by information 140. Therefore, the optical signals are modulated by the information 140. After transmission through the optical medium 110, the optical signals can be received by another transducer 150. The transducer 150 can convert the optical signals back to electrical signals.

Optical communication systems generally include transmission of multiple carrier signals in which each of the carrier signals is transmitted at a different transmit frequency. Each individual transmission signal is typically modulated by an information signal. Each of the transmission signals can be individually received, and the information signals can be detected.

FIG. 2 shows a frequency spectrum of multiple transmission signals. The transmission signals each include a carrier frequency FC1, FC2, FC3, FC4. The frequency spectrum allocated to each of the carrier frequencies is generally referred to as a transmission channel. The amount of frequency spectrum allocated to each transmission channel generally determines the amount of information that can be transmitted through the transmission channel. It is desirable to utilize as much of the allocated frequency spectrum as possible.

The frequency spectrum of FIG. 2 shows transmission signals 210, 220, 230, 240 at the carrier frequencies FC1, FC2, FC3, FC4. Frequency spectrum adjacent to each of the transmission signals 210, 220, 230, 240 is generally occupied by information that is modulated onto the transmission signals 210, 220, 230, 240. Generally, the greater the modulation rate of the information (typically, the modulation rate is proportional to the amount of information) the greater the amount of frequency spectrum occupied by each transmission signal and associated modulation information. The modulation rate of each transmission signal should not be so large that the modulation information of one transmission signal interferes with the modulation information of a neighboring transmission signal.

FIG. 3 shows a frequency spectrum of multiple transmission signals 310, 320, 330, 340 in which information from neighboring transmission channels overlap. That is, information intended for transmission through one transmission channel, is unintentionally transmitted within another transmission channel. For example, the modulation information of the first transmission signal 310 overlaps with the modulation information of the second transmission signal 320, as designated 315. The modulation information of the second transmission signal 320 overlaps with the modulation information of the third transmission signal 330, as designated 325. The modulation information of the third transmission signal 330 overlaps with the modulation information of the fourth transmission signal 340, as designated 335.

The overlap can be due to distortion of the transmission signals due to components within a transmission system being non-ideal. The distortion can include noise, spurious signals and harmonics of transmission signals overlapping with neighboring transmission signals.

Information signal channel frequency overlap from one transmission channel to another transmission channel, introduces transmission errors. Transmission errors reduce the effectiveness of a communication system. Additionally, transmission errors can reduce the transmission bandwidth of a communication.

It is desirable to provide filtering of optical communication signals to reduce the amount of frequency spectrum overlap between transmission signals of the communication signals.

SUMMARY OF THE INVENTION

The invention includes an apparatus and method of filtering of optical communication signals to reduce the amount of frequency spectrum overlap between transmission signals of the communication signals.

An embodiment of the invention includes an optical signal transmission transducer. The optical signal transmission transducer includes a magnetic tunnel junction. The magnetic tunnel junction can be tuned to switch states in response to selected frequencies of a magnetic field. A light source can be modulated based upon states of the magnetic tunnel junction.

An alternate embodiment of the optical signal transmission transducer includes a light transducer that generates magnetic sense signals based upon reception of modulated light signals. The light transducer can be integrated with a magnetic tunnel junction. The magnetic tunnel junction can be tuned to switch states in response to selected frequencies of the magnetic sense signal.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 11 is a flow chart that includes acts according to an embodiment of the invention.

DETAILED DESCRIPTION

Figure 1:
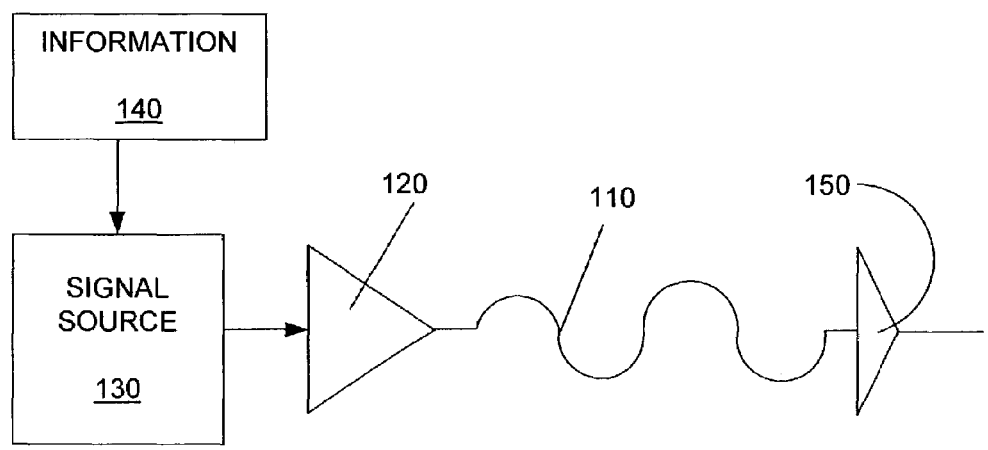
FIG. 1 shows an optical fiber that can operate as a transmission path for optical signals.
Figure 2:
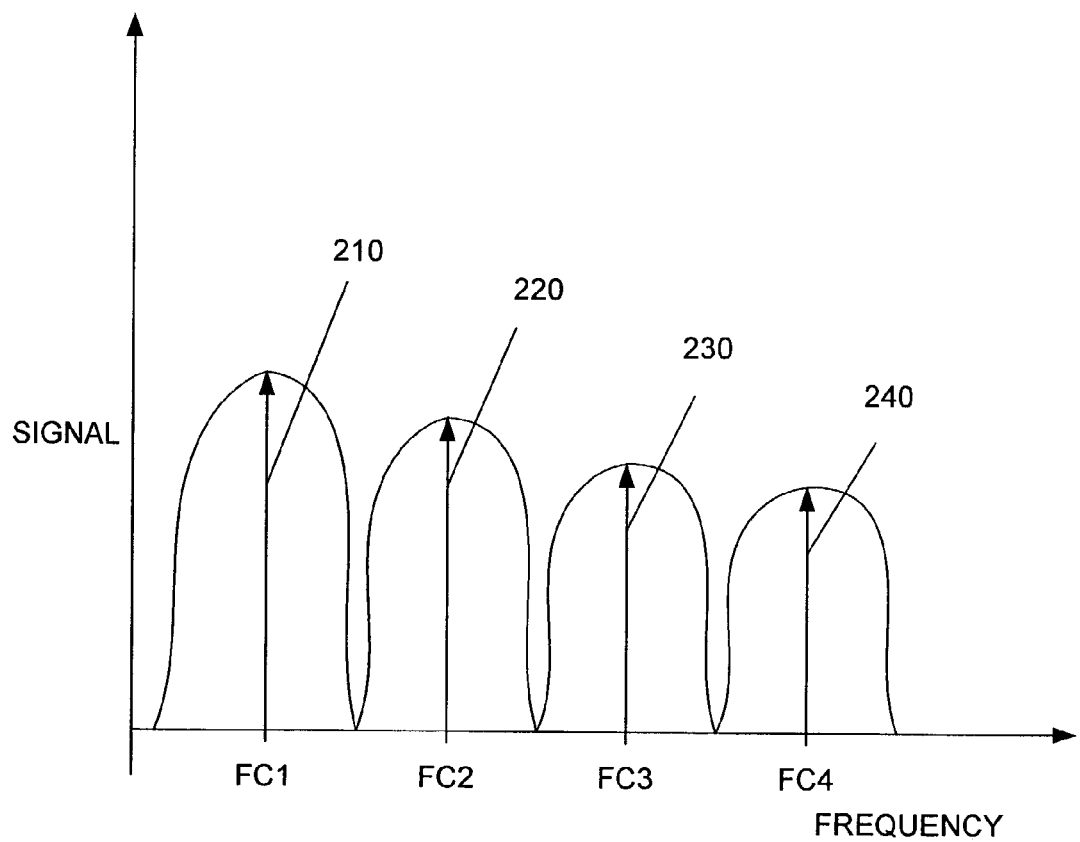
FIG. 2 shows a frequency spectrum of several modulated carrier signals.
Figure 3:
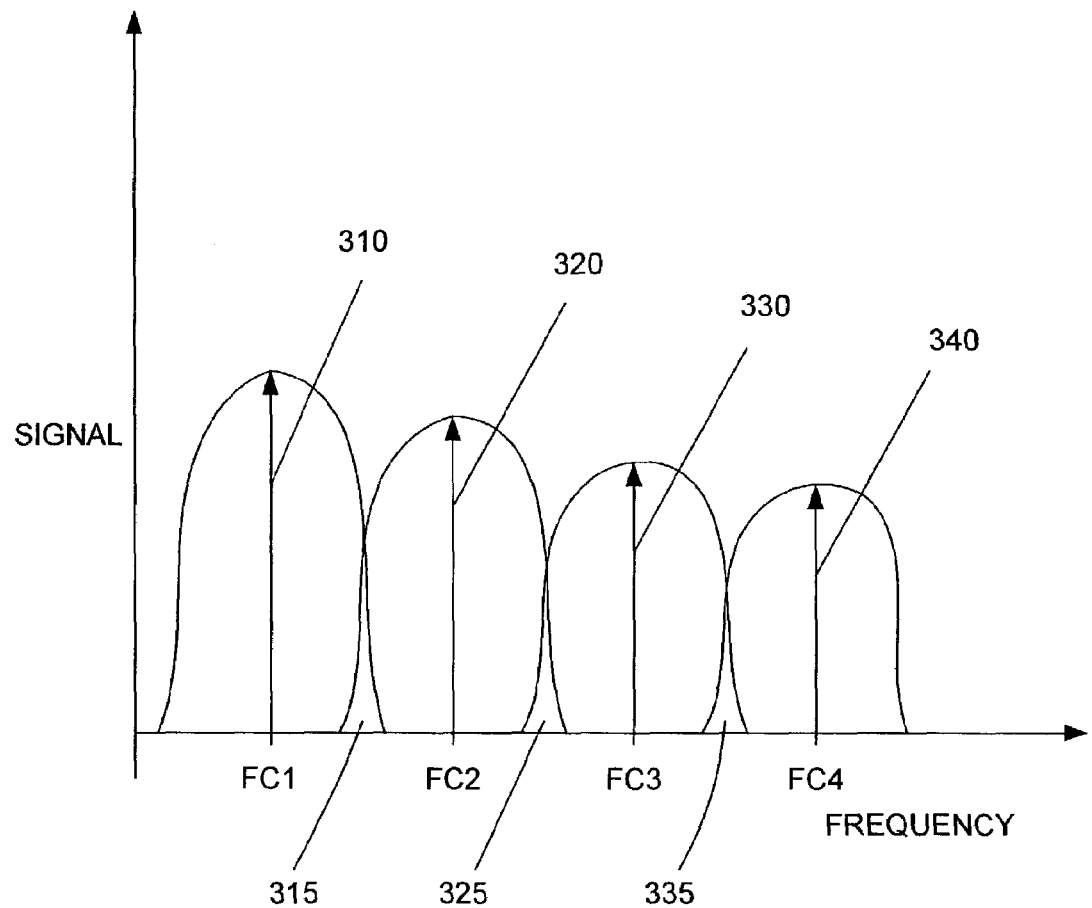
FIG. 3 shows a frequency spectrum of several modulated carrier signals that include frequency spectrum overlap between neighboring channels.

As shown in the drawings for purposes of illustration, the invention is embodied in an apparatus and method of filtering of optical communication signals to reduce the amount of frequency spectrum overlap between transmission signals of the optical communication signals.

Figure 4:
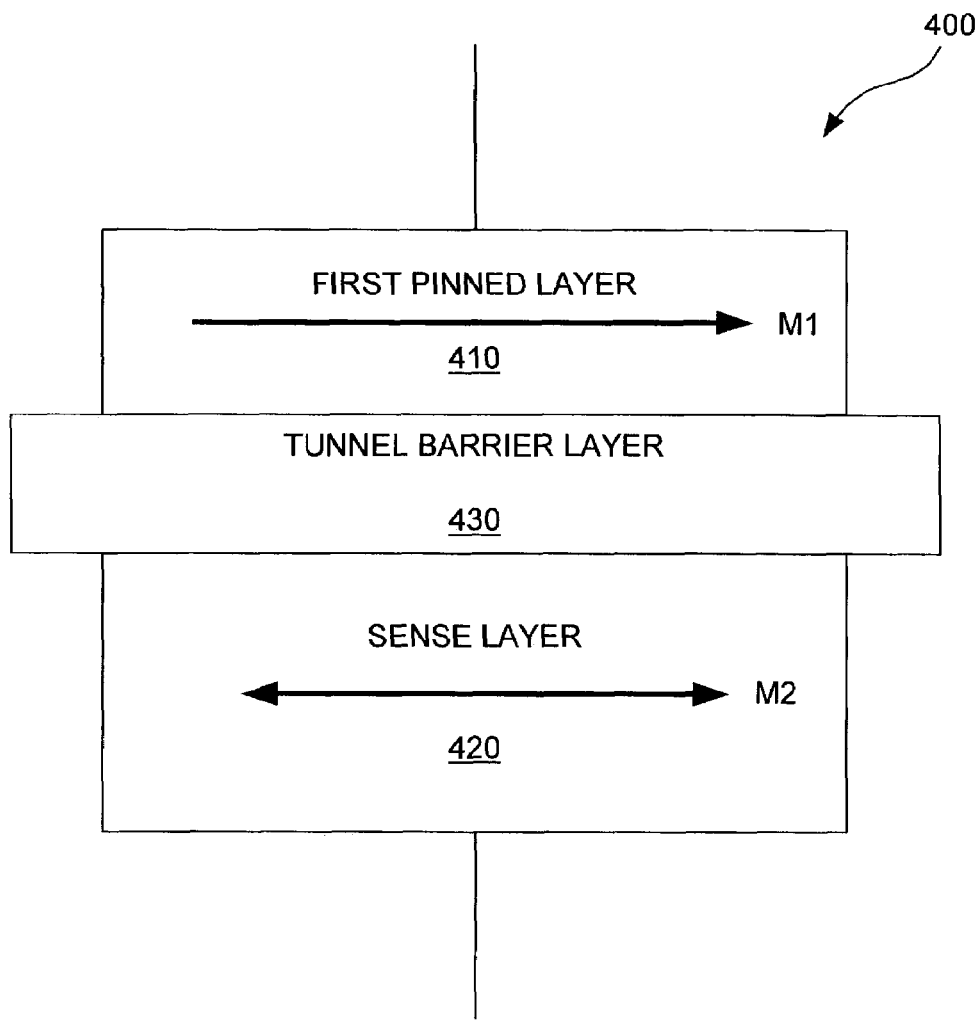
FIG. 4 shows a magnetic tunnel junction sensor.

FIG. 4 shows an embodiment of a magnetic tunnel junction sensor 400 that includes a reference layer 410, a sense layer 420 and an insulating layer 430.

The magnetic tunnel junction sensor 400 can be used to detect the presence of a magnetic field. A magnetic tunnel junction sensor based on tunneling magneto-resistive devices can include spin dependent tunneling junctions. The reference layer 410 has a magnetization orientation that is fixed so as not to rotate in the presence of an applied magnetic field in a range of interest. The sense layer 420 has a magnetization that can be oriented in either one of two directions. If the magnetizations of the reference layer 410 and the sense layer 420 are in the same direction, the orientation of the spin-dependent tunnel junction is said to be parallel. If the magnetizations of the reference layer 410 and the sense layer 420 are in opposite directions, the orientation of the spin-dependent tunnel junction is said to be anti-parallel. The two stable orientations, parallel and anti-parallel, may correspond to logic values of "0" and "1".

The magnetic orientation of the sense layer 420 is generally aligned in a direction corresponding to a direction of the last external magnetic field in the vicinity of the sense layer 420. The external magnetic field must have enough magnetic strength to alter the orientation of the sense layer 420 in order for the magnetic field to be detected.

A resistance across the magnetic tunnel junction sensor 400 will vary in magnitude depending upon the magnetic orientation of the sense layer 420 with respect to the magnetic orientation of the reference layer 410. Typically, if the sense layer 420 has a magnetic orientation that is in the opposite direction as the reference layer 410, then the resistance across the magnetic tunnel junction sensor 400 will be large. If the sense layer 420 has a magnetic orientation that is in the same direction as the reference layer 410, then the resistance across the magnetic tunnel junction sensor 400 will be less. Therefore, the resistance across the magnetic tunnel junction sensor 400 can be used to sense the direction of a magnetic field because the direction of the magnetic field determines the magnetic orientation of the sense layer 420 with respect to the reference layer 410, and therefore, the resistance across the magnetic sensor 400.

The reference layer 410 and the sense layer 420 can be made of a ferromagnetic material. The reference layer 410 can be implemented with a magnetically soft reference layer, or with a magnetically pinned layer.

If the magnetization of the sense layer 420 and the reference layer 410 of the magnetic tunnel junction sensor 400 are in the same direction, the orientation of the magnetic tunnel junction sensor 400 can be referred to as being "parallel." If the magnetization of the sense layer 420 and the reference layer 410 of the magnetic tunnel junction sensor are in opposite directions, the orientation of the magnetic tunnel junction sensor can be referred to as being "anti-parallel." The two orientations, parallel and anti-parallel, can correspond to magnetic sensor states of low or high resistance.

The insulating tunnel barrier 430 allows quantum mechanical tunneling to occur between the reference layer 410 and the sense layer 420. The tunneling is electron spin dependent, causing the resistance of the magnetic tunnel junction sensor to be a function of the relative orientations of the magnetization directions of the reference layer 410 and the sense layer 420. The presence of a magnetic field can be detected by establishing the magnetization orientations of the reference layer 410 and the sense layer 420.

The resistance of the magnetic tunnel junction sensor 400 is a first value (R) if the magnetization orientation of the magnetic tunnel junction sensor 400 is parallel and a second value (R+delta) if the magnetization orientation is anti-parallel. The invention, however, is not limited to the magnetization orientation of the two layers, or to just two layers.

The insulating tunnel barrier 430 can be made of aluminum oxide, silicon dioxide, tantalum oxide, silicon nitride, aluminum nitride, or magnesium oxide. However, other dielectrics and certain semiconductor materials may also be used for the insulating tunnel barrier 430. The thickness of the insulating tunnel barriers 430 may range from about 0.5 nanometers to about three nanometers. However, the invention is not limited to this range.

The sense layer 420 may be made of a ferromagnetic material. Both the sense layer 420, and the reference layer 410 can be implemented as a synthetic ferrimagnet (SF), also referred to as an artificial antiferromagnet.

The sense layer 430 of the tunnel junction sensor 400 will generally align in a direction that corresponds with a direction of an externally applied magnetic field.

Figure 5:
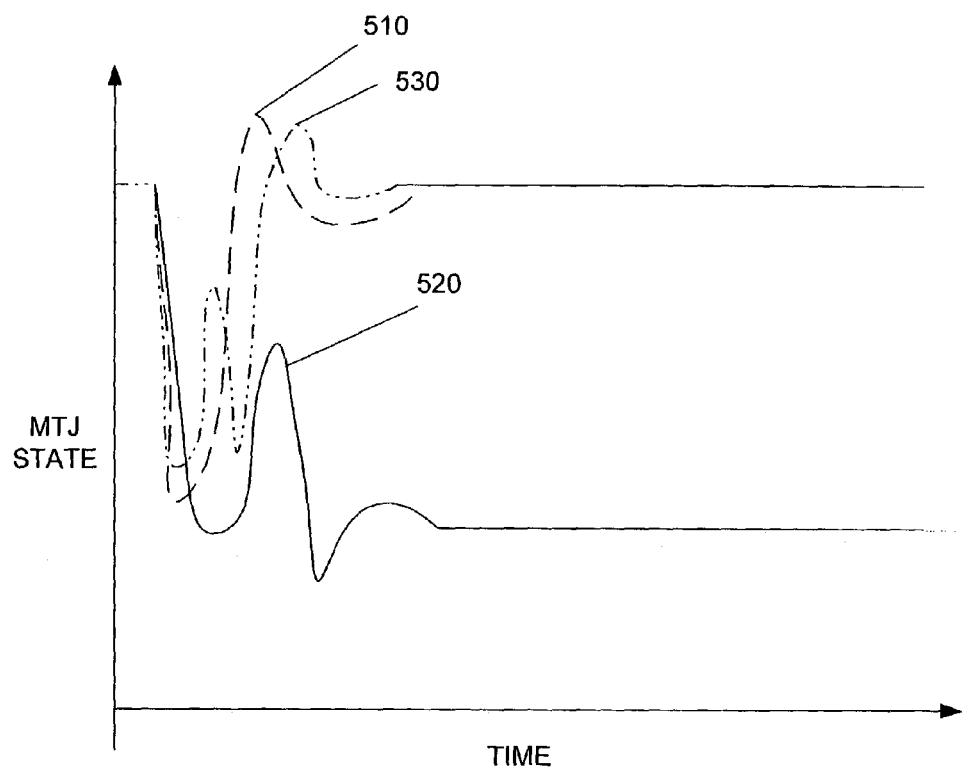
FIG. 5 shows waveforms depicting switching of a magnetic tunnel junction sensor when magnetic switching signals of varying pulse widths are applied to the magnetic tunnel junction sensor.

FIG. 5 shows waveforms depicting switching of a magnetic tunnel junction sensor when magnetic switching signals of varying pulse widths are applied to the magnetic tunnel junction sensor. A first waveform 510 depicts the state of the magnetic tunnel junction sensor when a magnetic field having a pulse width of 125 ps is applied. A second waveform 520 depicts the state of the magnetic tunnel junction sensor when a magnetic field having a pulse width of 250 ps is applied. A third waveform 530 depicts the state of the magnetic tunnel junction sensor when a magnetic field having a pulse width of 350 ps is applied. The amplitude of the magnetic field applied is 200 Oe for each of the waveforms.

The waveforms show that the magnetic tunnel junction sensor is more likely to switch states for particular pulse widths rather than others. For example, the waveforms of FIG. 5 show the magnetic tunnel junction sensor switching states of a pulse width of 250 ps.

Due to a switching characteristic of magnetic tunnel junctions (generally referred to as precessional switching), magnetic tunnel junctions will switch for pulses of particular pulse widths, but not for other pulse widths. Typically, there are many selective ranges of pulse widths that cause the magnetic tunnel junction to switch. The pulse widths can be equated to periods of sinusoidal waveforms. Sinusoidal waveforms that include "on" period equivalent to the selected pulse widths can cause the magnetic tunnel junction to change states. This time/frequency selective characteristic of magnetic tunnel junctions allows the magnetic tunnel junctions to be used as a selective switch or filter.

The selective time/frequency switching characteristics of magnetic tunnel junctions can be experimentally or computationally determined. Therefore, the magnetic tunnel junctions can be tuned to selectively pass signals that include particular frequencies.

Many applications exist that can utilize the selective signal frequency pass bands of the invention. The descriptions provided here of signal transmitters and signal receivers that can utilize a frequency comb filter as provided by the invention are merely examples of useful applications of the invention. The invention can be utilized in many different applications where high frequency selective filtering is beneficial.

Precessional Switching

Precessional switching is a phenomenon that can be used to describe the transitional regions of the switching curves of FIG. 5. Precessional switching will first be described as applied to a single magnetic dipole, and then as applied to a magnetic tunnel junction of the invention.

Figure 6A:
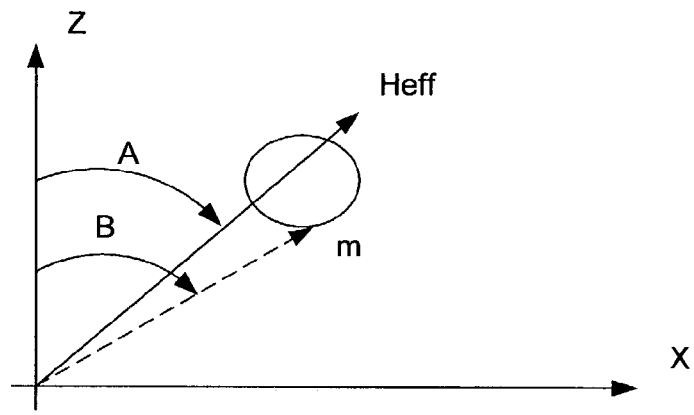
FIG. 6A shows a magnetic dipole and an applied magnetic field.

FIG. 6A shows a magnetic moment m of a single magnetic dipole. If a magnetic field Heff is applied to the magnetic dipole, the magnetic dipole will experience precession about an axis of the applied magnetic field Heff as the magnetic dipole attempts to align with the applied magnetic field Heff. The precession is depicted by a circular rotation 610 about the axis of the applied magnetic field Heff.

As shown in FIG. 6A, the axis of the applied magnetic field is at an angle A with respect to the depicted z-axis, and the magnetic moment of the dipole is at an angle B with respect to the depicted z-axis.

The precession can be calculated by an equation of motion as given by:

$(1/\gamma)(dm/dt) = m \times Heff$, where m is the magnetic moment of the dipole, and $\gamma$ is the well known gyromagnetic ratio. A standard value of $\gamma$ can be given as $1.76 \times 10^7 Oe^{-1} s^{-1}$.

The estimated precession of the magnetic tunnel junctions of the invention, further include damping and exchange interactions between a large number of dipoles that are used to model the sense layer of the magnetic tunnel junction. Once these factors are included, and the calculations summed for all dipoles of a ferromagnetic bit of a magnetic tunnel junction, a final equation of motion generally termed the Landau-Lifshitz-Gilbert equation can be used to determine the precession of the magnetic tunnel junction. This equation of motion can be represented as:

$(dM/dt) = -\gamma(M \times (\delta w/\delta M)) - (\alpha/M)(M \times (dM/dt))$; where M is the magnetization vector, $\gamma$ is the gyromagnetic ratio, $\alpha$ is a damping ratio, $(\delta w/\delta M)$ is a total derivative of the energy density with magnetization Heff.

Figure 6B:
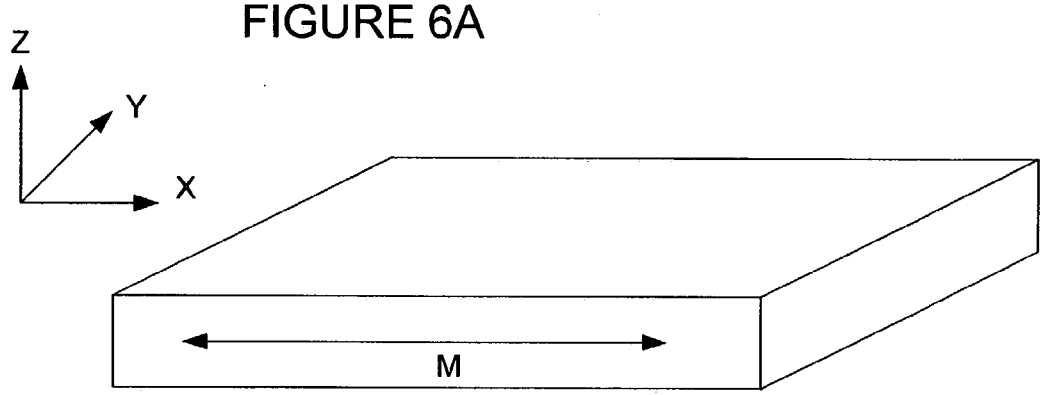
FIG. 6B shows a sense layer of a magnetic tunnel junction.

FIG. 6B shows a sense layer of a magnetic tunnel junction and the corresponding x-axis, y-axis and z-axis.

Figure 6C:
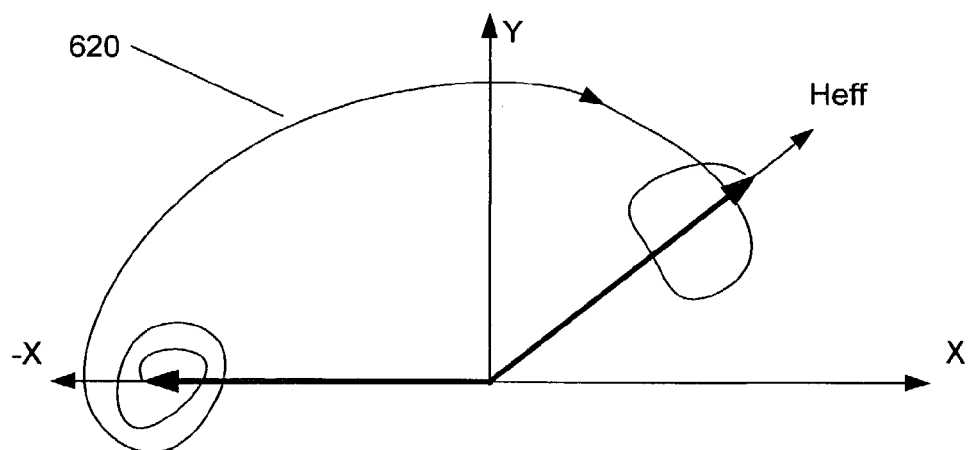
FIG. 6C shows the precessional motion of a magnetization vector of a magnetic tunnel junction.

FIG. 6C shows an example of the precession of the magnetization M (also referred to as the net magnetic moment) of the sense layer as calculated by the previously described Landau-Lifshitz-Gilbert equation.

As shown in FIG. 6C, initially, the magnetization vector M of the magnetic tunnel junction is oriented along the x-axis. Once the magnetic field Heff is applied, the magnetization vector M begins to rotate and change direction according to the line 620 as the magnetization vector M attempts to align with the magnetic field Heff. The speed at which the magnetization vector M changes directions is dependent upon the damping elements of the motion, and geometry and materials of the magnetic tunnel junction. The motion can be simulated by the Landau-Lifshitz-Gilbert equation using micromagnetic models in the dynamic domain (that is, time scales of less than 1 ns).

For the invention, the precession is modeled to provide predictions of the exact amplitude and duration of a magnetic pulse required to cause the magnetization vector of a magnetic tunnel junction to switch. The duration and amplitude of the applied magnetic pulse are varied to identify specific frequencies at which the magnetic tunnel junction will switch. The selective switching frequencies are used to provide the filter effects of the invention.

Figure 7:
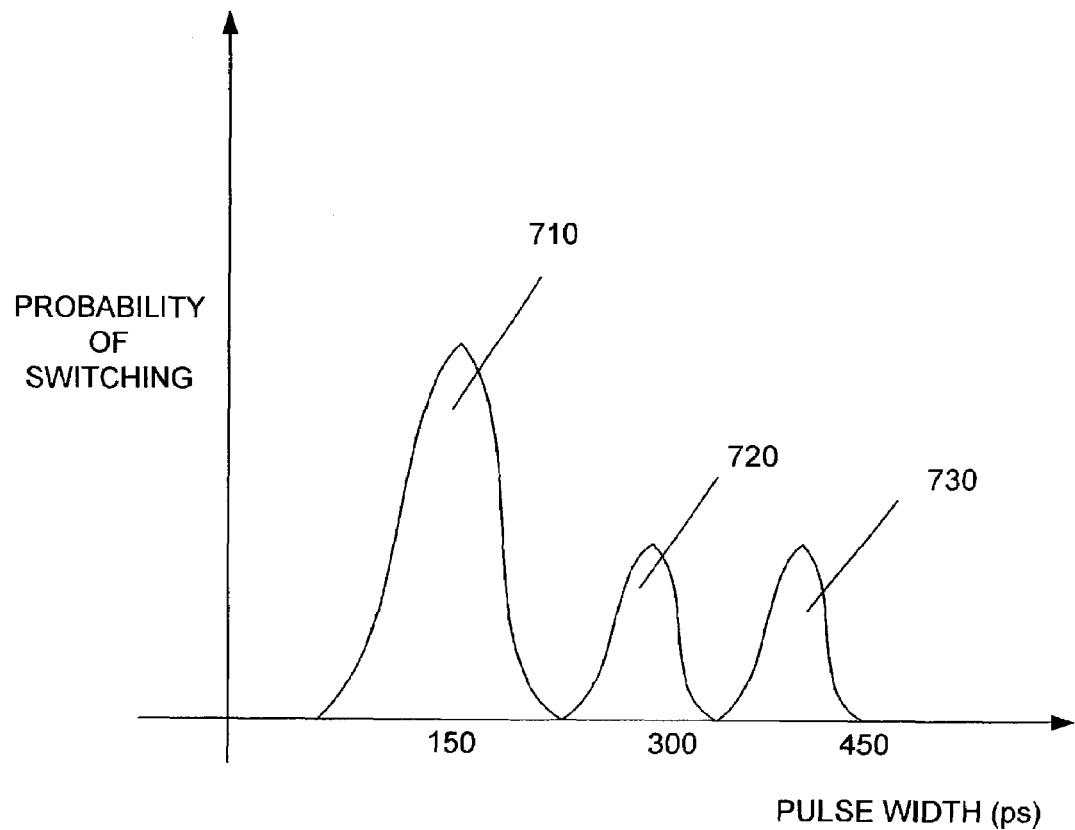
FIG. 7 shows a plot depicting a probability that a magnetic tunnel junction will change states when magnetic switching signals of varying pulse widths are applied to the magnetic tunnel junction sensor.

FIG. 7 shows a plot depicting a probability that a magnetic tunnel junction will change states when magnetic switching signals of varying pulse widths are applied to the magnetic tunnel junction sensor. A first peak 710 occurs for a pulse width of 150 ps. A second peak 720 occurs for a pulse width of 290 ps. A third peak 730 occurs for a pulse width of 430 ps.

All of the pulses include an amplitude of 200 Oe. The pulse width may vary for different pulse amplitudes.

According to the plot, pulse widths of 150 ps, 290 ps and 430 ps are more likely to cause the magnetic tunnel junction to change states. This plot can be used to determine the pass band frequencies of a comb filter formed by the magnetic tunnel junction. Generally, signals will be passed that have a frequency that includes a time period that is equivalent to the pulse widths of the pulses that cause the tunnel magnetic junction to switch.

For example, if a signal that includes an amplitude of greater than 200 Oe for a duration of 150 ps, will cause the magnetic tunnel junction to switch states, and the signal will not be filtered (that is, it will pass through) by the magnetic tunnel junction.

The pass bands of the magnetic comb filter of the invention can be tuned. That is, the pass bands of the comb filter can be tuned. The tuning can be accomplished by manipulating the materials within the MTJ, or by manipulating the physical characteristics of the magnetic tunnel junction. The actual tuning frequencies can be simulated and experimentally determined.

Additionally, the pass bands of the comb filter of the invention can be tuned on the fly. That is, a magnetic field can be applied orthogonal (that is, in a different direction) to the direction of magnetization of the reference and sense layers. This applied field alters the pulse widths required to cause the magnetic tunnel junction to switch. Therefore, the frequencies of the pass-bands of the comb filter are altered. The effects of the magnetic fields applied in an orthogonal direction can be simulated and experimentally determined. The pass band frequencies of the magnetic tunnel junction can be determined either experimentally, through simulation, or through a combination of both.

Figure 8:
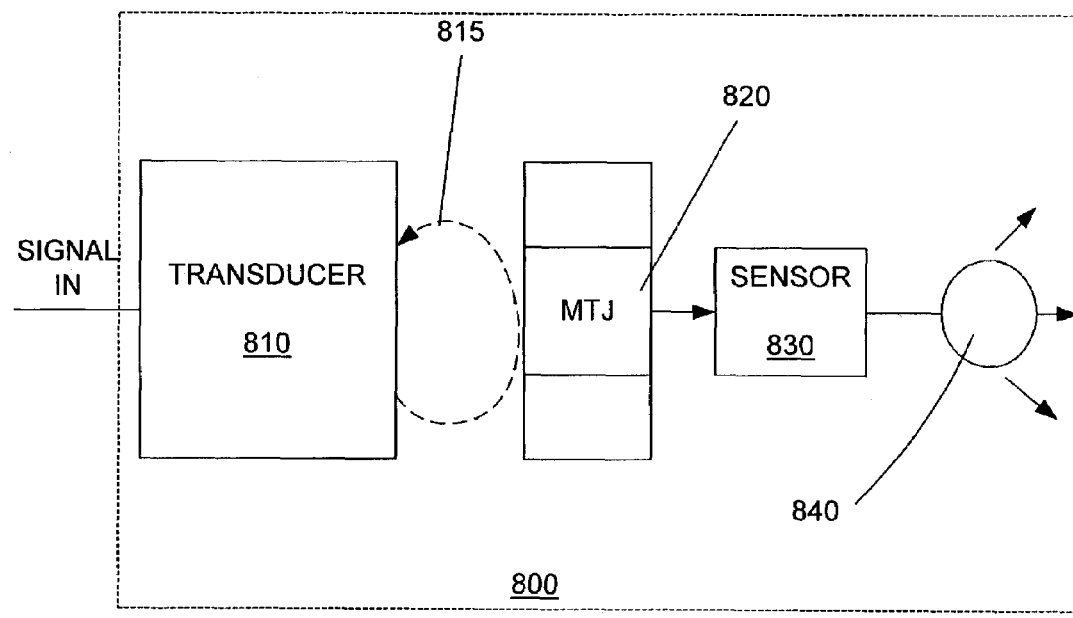
FIG. 8 shows an optical transmitter according to an embodiment of the invention.

FIG. 8 shows an optical signal transmission transducer 800 according to an embodiment of the invention. The optical signal transmission transducer 800 can receive an electronic signal (the electronic signal can include several different signals in which each signal includes a separate carrier frequency) and a light source is modulated by a comb filtered version of the electronic signal.

This embodiment of the optical signal transmission transducer 800 includes a transducer 810 that can receive the electronic signal and generate a magnetic field having an intensity proportional to the electronic signal. The transducer should be operable at frequencies that are included within the electronic signal.

This embodiment of the optical signal transmission transducer 800 further includes a magnetic tunnel junction 820. The magnetic tunnel junction 820 can be tuned to switch states in response to selected frequencies of the magnetic field. The material and physical parameters of the magnetic tunnel junction 820 generally define the frequency component filtering of the magnetic tunnel junction 820, and therefore, the filtering of the optical signal transmission transducer 800.

A magnetic tunnel junction sensor 830 can sense the states of the magnetic tunnel junction 820. As previously described, the states of the magnetic tunnel junction 820 can be determined by sensing a resistance across the magnetic tunnel junction 820.

As previously described, only certain frequency components of the electronic signal will pass through the magnetic tunnel junction 820. Additionally, as previously stated, the frequency components that pass through the magnetic tunnel junction 820 can be tuned either by design, or while in operation.

A light source 840 can be electronically connected to the magnetic tunnel junction sensor 830. The light source can be modulated based upon states of the magnetic tunnel junction 820. The light source 840 can include a light emitting diode, or a laser, in which an intensity of light emitted by the diode or the laser can be electronically controlled.

Figure 9:
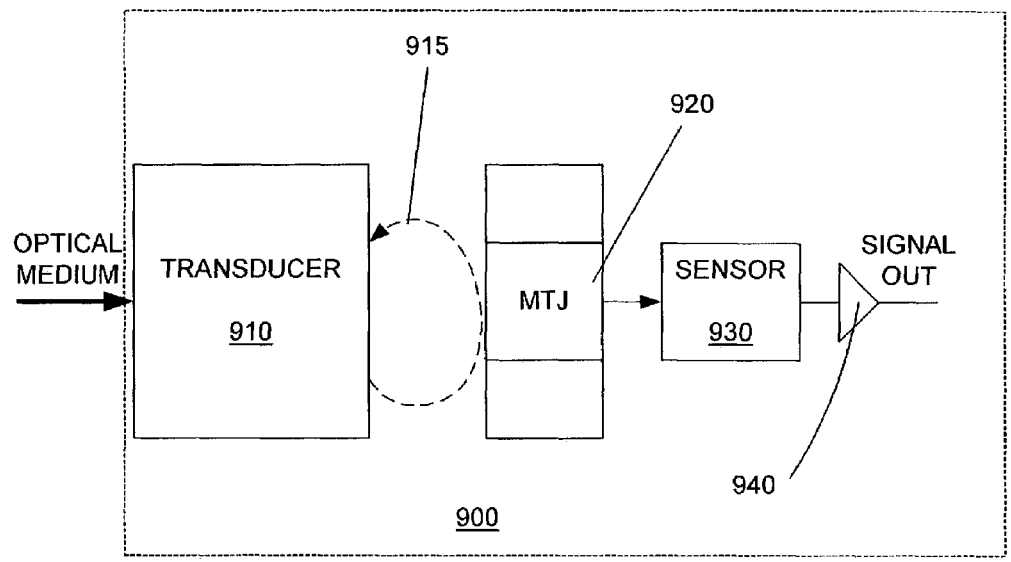
FIG. 9 shows an optical receiver according to another embodiment of the invention.

FIG. 9 shows an optical signal transmission transducer 900 according to another embodiment of the invention. Generally, the optical signal transmission transducer 900 receives an optical signal, comb filters the optical signal, and generates an electronic equivalent of the received optical signal. The received optical signal can include many different information signals in which each information signal includes a separate carrier frequency.

The optical signal transmission transducer 900 includes a transducer 910 that converts the received optical signal into a magnetic field in which an intensity of the magnetic field is dependent upon the optical signal. The transducer 910 can include sub-transducers that convert the optical signal into an electronic signal, and then convert the electronic signal into an electromagnetic signal.

The optical signal transmission transducer 900 further includes a magnetic tunnel junction 920. The magnetic tunnel junction 920 can be tuned to switch states in response to selected frequencies of the magnetic field. The material and physical parameters of the magnetic tunnel junction 920 generally define the frequency component filtering of the magnetic tunnel junction 920, and therefore, the filtering of the optical signal transmission transducer 900.

A magnetic tunnel junction sensor 930 can sense the states of the magnetic tunnel junction 920. As previously described, the states of the magnetic tunnel junction 920 can be determined by sensing a resistance across the magnetic tunnel junction 920.

As previously described, only certain frequency components of the electronic signal will pass through the magnetic tunnel junction 920. Additionally, as previously stated, the frequency components that pass through the magnetic tunnel junction 920 can be tuned either by design, or while in operation.

The embodiment of FIG. 9 further includes a buffer amplifier 940.

Figure 10:
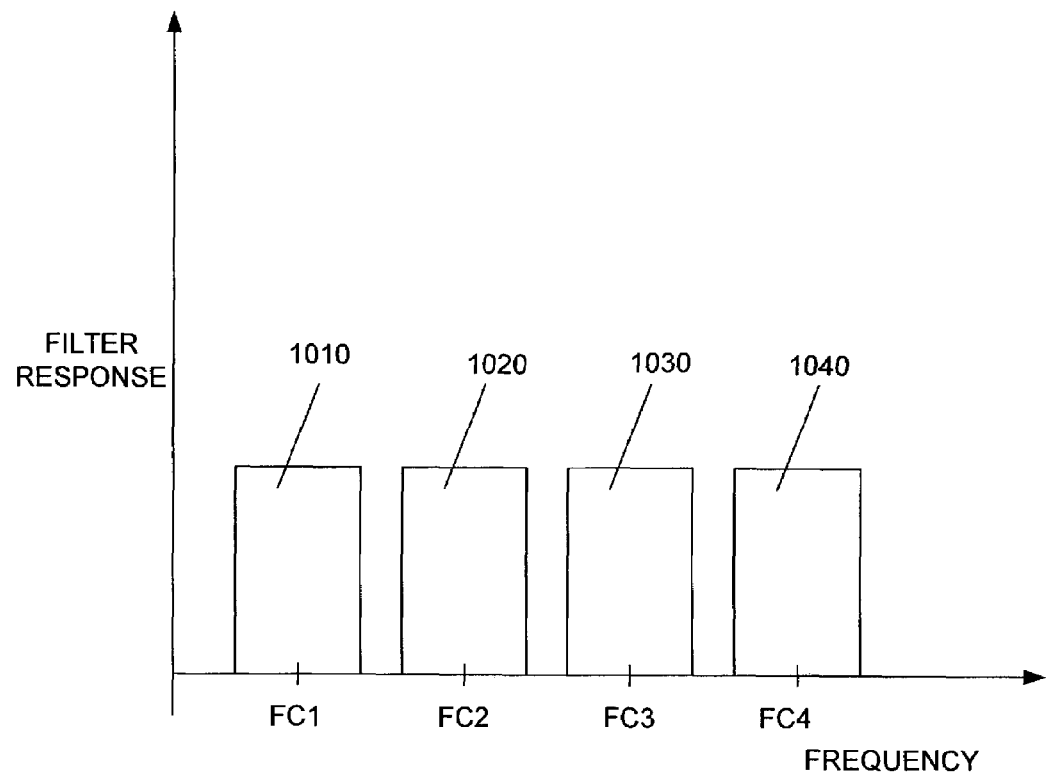
FIG. 10 shows a frequency response of a magnetic comb filter according to an embodiment of the invention.

FIG. 10 shows an ideal frequency response of a magnetic comb filter according to an embodiment of the invention. The frequency response allows particular frequency components to pass through the comb filter, while filtering or attenuating other frequency components. More precisely, the frequency response includes frequency pass bands 1010, 1020, 1030, 1040. The invention provides selective filtering of electromagnetic signals. As previously described, the tuning of the pass bands of the filtering provided by the invention can be tuned. Additionally, the pass bands can be actively tuned in real-time by applying additional magnetic fields to the magnetic tunnel junctions of the invention. Generally, the additional magnetic fields are applied in an a direction that is orthogonal to the magnetic field generated by the applied signals to be filtered.

As previously described, the selective time/frequency switching characteristics of magnetic tunnel junctions can be experimentally or computationally determined. Therefore, the magnetic tunnel junctions can be tuned to selectively pass signals that include particular frequencies.

Many applications exist that can utilize the selective signal frequency pass bands of the invention. The descriptions provided here of signal transmitters and signal receivers that can utilize a frequency comb filter as provided by the invention are merely examples of useful applications of the invention. The invention can be utilized in many different applications where high frequency selective filtering is beneficial.

FIG. 11A is a flow chart that includes act according to an embodiment of the invention. This embodiment includes a method of filtering a plurality of separate frequency transmission signals.

A first step 1105 includes filtering a plurality of information carrying signals with a magnetic tunnel junction, the magnetic tunnel junction being tuned to switch states in response to selected frequencies of the magnetic field.

A second step 1110 includes sensing the states of the magnetic tunnel junction.

A third step 1115 includes driving a light source with the sensed states of the magnetic tunnel junction.

FIG. 11B is a flow chart that includes act according to another embodiment of the invention. This embodiment includes a method of filtering a plurality of separate frequency transmission signals.

A first step 1120 includes sensing a plurality of information carrying optical signals.

A second step 1125 includes filtering the plurality of information carrying optical signals with a magnetic tunnel junction, the magnetic tunnel junction being tuned to switch states in response to selected frequencies of the magnetic field.

A third step 1130 includes sensing the states of the magnetic tunnel junction.

Figure 12:
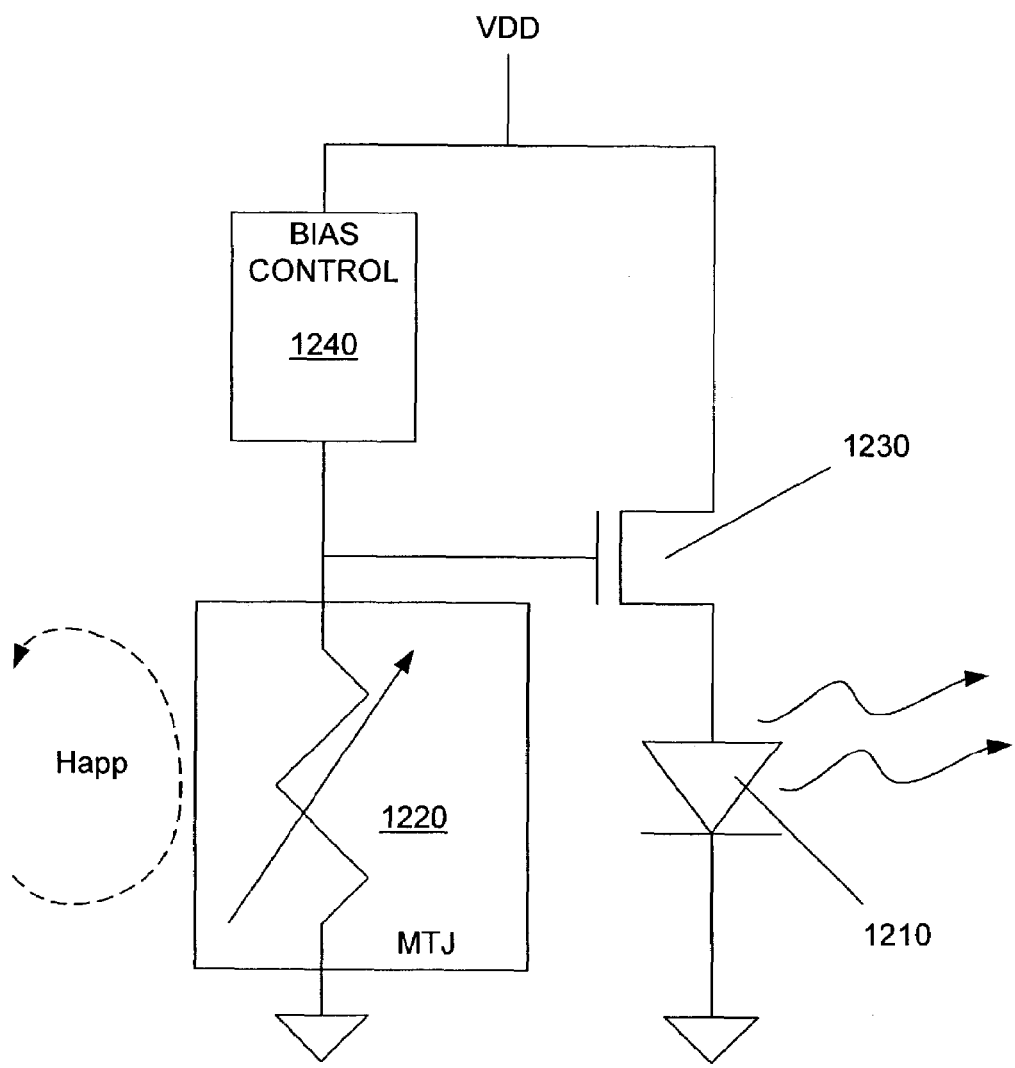
FIG. 12 shows a circuit schematic of an optical signal transmission transducer according to another embodiment of the invention.

FIG. 12 shows a circuit schematic of an optical signal transmission transducer according to another embodiment of the invention. This embodiment includes a light emitting diode (LED) 1210 that emits light. The amount of light emitted from the LED 1210 can be dependent upon a bias current flowing through the LED 1210.

The intensity of the light emitted by the LED 1210 can be controlled by a resistance of a magnetic tunnel junction 1220. As previously described, the resistance of the tunnel magnetic junction 1220 is dependent upon the state of the tunnel magnetic junction 1220. Therefore, the states of the magnetic tunnel junction 1220 control the intensity of the light emitted from the LED 1210. The states of the tunnel magnetic junction 1220 are determined by the application of a magnetic field Happ.

The embodiment shown in FIG. 12 further includes a bias transistor 1230 and a bias controller 1240. The bias controller 1240 can be configured so that the bias current flowing through the LED 1210 is dependent upon the resistance of the tunnel magnetic junction 1220, and therefore, the state of the tunnel magnetic junction 1220.

The embodiment of FIG. 12 is merely an example of circuit in which the intensity of a light source is modulated based upon the state of a magnetic tunnel junction. Many other possible circuits that provide for modulation of a light source depending upon the resistance of a magnetic tunnel junction are possible.

An alternate embodiment includes the light emitting source being a laser diode such as a vertical cavity surface emitting laser (VCSEL). The invention can also use other modulated light sources.

Figure 13:
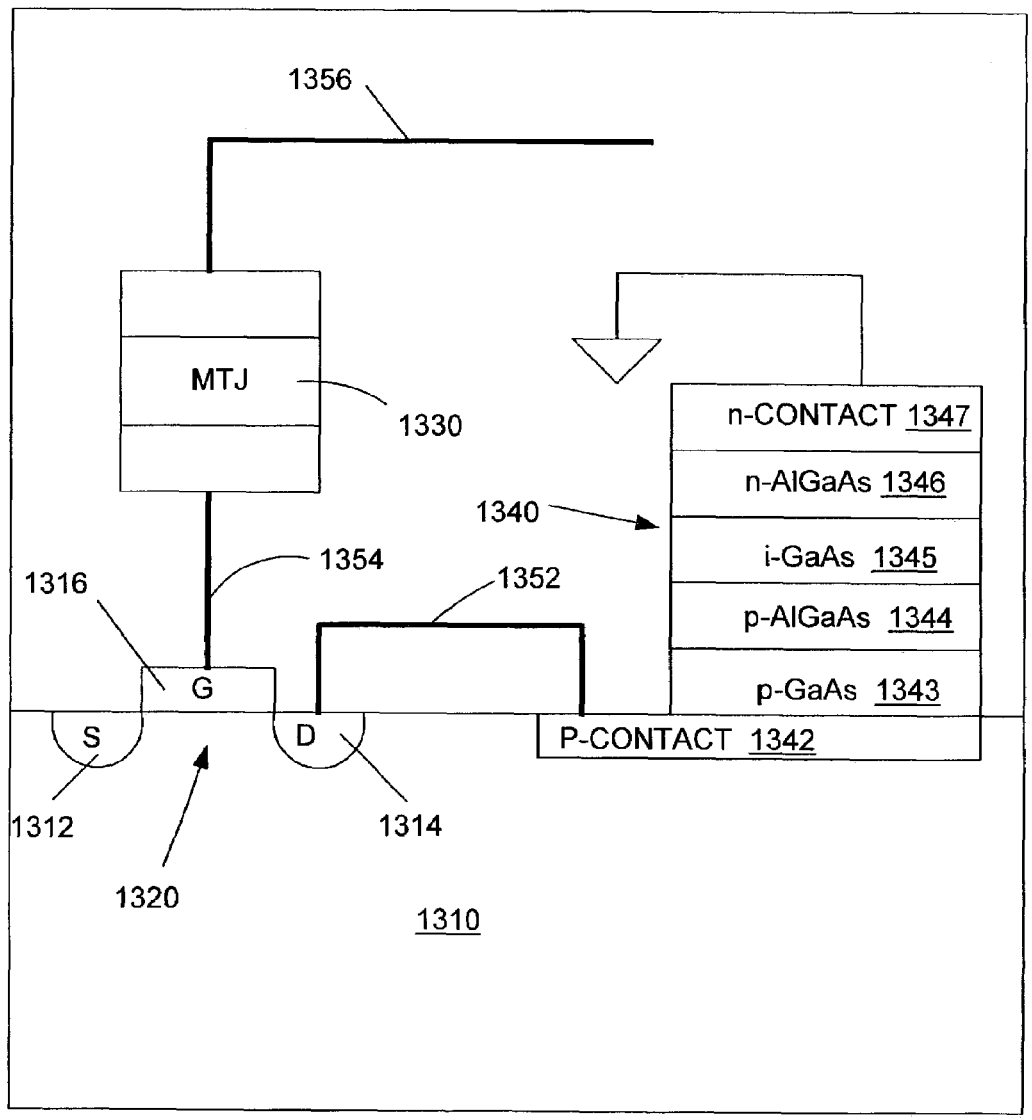
FIG. 13 shows a configuration of a substrate of an optical signal transmission transducer according to another embodiment of the invention.

FIG. 13 shows a configuration of a substrate 1310 of an optical signal transmission transducer according to another embodiment of the invention. The substrate includes a controlling transistor 1320, a magnetic tunnel junction 1330 and a controllable light emitting device 1340.

The controlling transistor 1320, the magnetic tunnel junction 1330 and the controllable light emitting device 1340 can be electrically connected through conductive lines 1352, 1354, 1356.

The controlling transistor 1320 can be formed in the substrate 1310, and include a source 1312, a drain 1314 and a poly-Si gate 1316. The magnetic tunnel junction 1330 can be formed over the controlling transistor 1320. The controlling transistor 1320 can be electrically connected to a light emitting device 1340.

Standard semiconductor processing steps can be used to form the controlling transistor 1320.

The light emitting device 1340 can include a PIN diode that includes a p-contact 1342, a p-AlGaAs layer 1343, an i-GaAs layer 1344 an n-AlGaAs layer 1445 and an n-contact 1346.

Standard semiconductor processing steps can be used to form the light emitting device 1340.

Standard semiconductor processing steps can be used to form the conductive lines 1352, 1354, 1356. Similar semiconductor processing steps can be used to form the conductive layers of the MTJ 1330.

The embodiment of FIG. 13 provides an integrated MTJ 1330 and light emitting device 1340 that can provide selective comb filtering. As previously described, the filtering is dependent upon the materials and physical characteristics of the MTJ 1330.

Although specific embodiments of the invention have been described and illustrated, the invention is not to be limited to the specific forms or arrangements of parts so described and illustrated. The invention is limited only by the appended claims.

What is claimed:

1. An optical signal transmission transducer:
   a magnetic tunnel junction, the magnetic tunnel junction being tuned to switch states in response to selected frequencies of a magnetic field; and
   a light source that is modulated based upon states of the magnetic tunnel junction.

2. The optical signal transmission transducer of claim 1, wherein the magnetic tunnel junction and the light source are integrated within a common substrate.

3. The optical signal transmission transducer of claim 1, further comprising a magnetic transducer that receives electrical signals and generates the magnetic field in response to the electrical signals.

4. The optical signal transmission transducer of claim 1, wherein the tuning of the magnetic tunnel junction can be adjusted.

5. The optical signal transmission transducer of claim 4, wherein the tuning of the magnetic tunnel junction can be adjusted by proper selection of materials of the magnetic tunnel junction.

6. The optical signal transmission transducer of claim 4, wherein the tuning of the magnetic tunnel junction can be adjusted by proper selection of physical dimensions of the magnetic tunnel junction.

7. The optical signal transmission transducer of claim 4, wherein the tuning of the magnetic tunnel junction can be additionally adjusted by application of a second magnetic field bias to the magnetic tunnel junction.

8. The optical signal transmission transducer of claim 3, wherein the magnetic transducer is responsive enough to generate the magnetic field at rates the magnetic tunnel junction changes states.

9. The optical signal transmission transducer of claim 3, wherein the magnetic transducer comprises an inductive coil.

10. An optical signal transmission transducer:
    a light transducer that generates magnetic sense signals based upon reception of modulated light signals;
    a magnetic tunnel junction, the magnetic tunnel junction being tuned to switch states in response to selected frequencies of the magnetic sense signal.

11. The optical signal transmission transducer of claim 10, further comprising a magnetic tunnel junction sensor that detects the states of the magnetic tunnel junction.

12. The optical signal transmission transducer of claim 10, wherein the light transducer comprises a light sensor and a magnetic transducer, the light sensor generating electrical signals in response to the modulated light signals, the magnetic transducer generating the magnetic sense signals in response to the electrical signals.

13. The optical signal transmission transducer of claim 10, wherein the tuning of the magnetic tunnel junction can be adjusted.

14. The optical signal transmission transducer of claim 13, wherein the tuning of the magnetic tunnel junction can be adjusted by proper selection of materials of the magnetic tunnel junction.

15. The optical signal transmission transducer of claim 13, wherein the tuning of the magnetic tunnel junction can be adjusted by proper selection of physical dimensions of the magnetic tunnel junction.

16. The optical signal transmission transducer of claim 13, wherein the tuning of the magnetic tunnel junction can be additionally adjusted by application of a second magnetic field bias to the magnetic tunnel junction.

17. An optical transmitter comprising:
    a plurality of carrier signal sources for generating a plurality of transmission signals, each transmission signal including transmission information, each transmission signal having a unique carrier frequency;
    a magnetic transducer for generating a magnetic field in response to the plurality of transmission signals;
    a magnetic tunnel junction, the magnetic tunnel junction being tuned to switch states in response to selected frequencies of the magnetic field; and
    a magnetic tunnel junction sensor for sensing the states of the magnetic tunnel junction; and
    a light source that is modulated by the sensed states of the magnetic tunnel junction.

18. The optical transmitter of claim 17, wherein the tuning of the magnetic tunnel junction can be adjusted.

19. The optical transmitter of claim 18, wherein the tuning of the magnetic tunnel junction can be adjusted by proper selection of materials of the magnetic tunnel junction.

20. The optical transmitter of claim 18, wherein the tuning of the magnetic tunnel junction can be adjusted by proper selection of physical dimensions of the magnetic tunnel junction.

21. The optical transmitter of claim 18, wherein the tuning of the magnetic tunnel junction can be additionally adjusted by application of a second magnetic field bias to the magnetic tunnel junction.

22. An optical receiver comprising:
   means for receiving a plurality of optical transmission signals, each optical transmission signal including transmission information, each optical transmission signal having a unique carrier frequency;
   a magnetic transducer for generating a magnetic field in response to the plurality of optical transmission signals;
   a magnetic tunnel junction, the magnetic tunnel junction being tuned to switch states in response to selected frequencies of the magnetic field; and
   a magnetic tunnel junction sensor for sensing the states of the magnetic tunnel junction.

23. The optical receiver of claim 22, wherein the tuning of the magnetic tunnel junction can be adjusted.

24. The optical receiver of claim 23, wherein the tuning of the magnetic tunnel junction can be adjusted by proper selection of materials of the magnetic tunnel junction.

25. The optical receiver of claim 23, wherein the tuning of the magnetic tunnel junction can be adjusted by proper selection of physical dimensions of the magnetic tunnel junction.

26. A method of filtering a plurality of separate frequency transmission signals, the method comprising:
   filtering a plurality of information carrying signals with a magnetic tunnel junction, the magnetic tunnel junction being tuned to switch states in response to selected frequencies of the magnetic field; and
   sensing the states of the magnetic tunnel junction; and
   driving a light source with the sensed states of the magnetic tunnel junction.

27. A method of filtering a plurality of separate frequency transmission signals, the method comprising:
   sensing a plurality of information carrying optical signals;
   filtering the plurality of information carrying optical signals with a magnetic tunnel junction, the magnetic tunnel junction being tuned to switch states in response to selected frequencies of the magnetic field; and
   sensing the states of the magnetic tunnel junction.

28. An optical signal transmission transducer:
   a magnetic transducer that receives electrical signals and generates the magnetic field in response to the electrical signals:
   a magnetic tunnel junction, the magnetic tunnel junction being tuned to switch states in response to selected frequencies of a magnetic field, the tuning of the magnetic tunnel junction being adjustable based upon at least one of proper selection of materials of the magnetic tunnel junction, proper selection of physical dimensions of the magnetic tunnel junction, application of a second magnetic field bias to the magnetic tunnel junction; and
   a light source that is modulated based upon states of the magnetic tunnel junction.

* * * * *